June 10, 1952   L. L. ERWIN   2,599,982
CLUTCH FINGER TOOL
Filed Oct. 27, 1949   2 SHEETS—SHEET 1
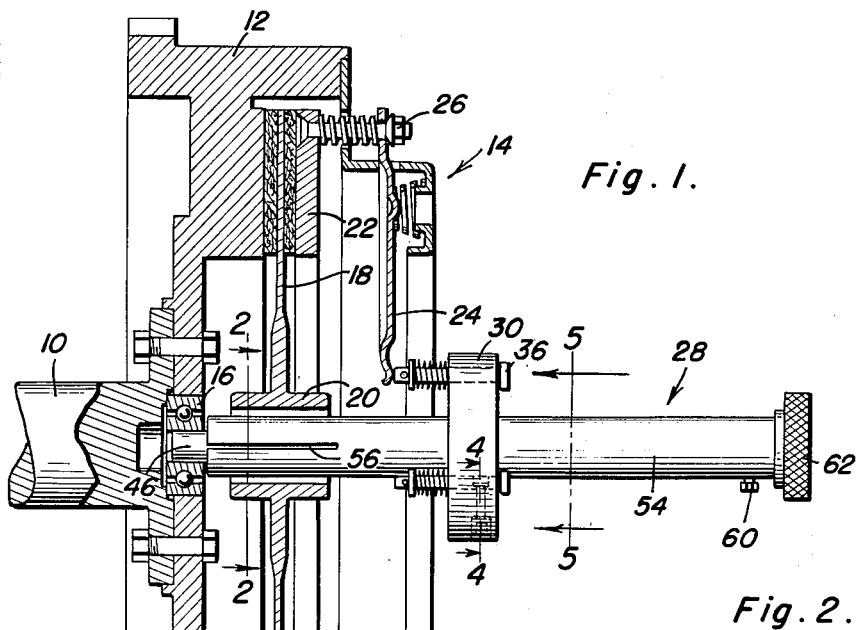
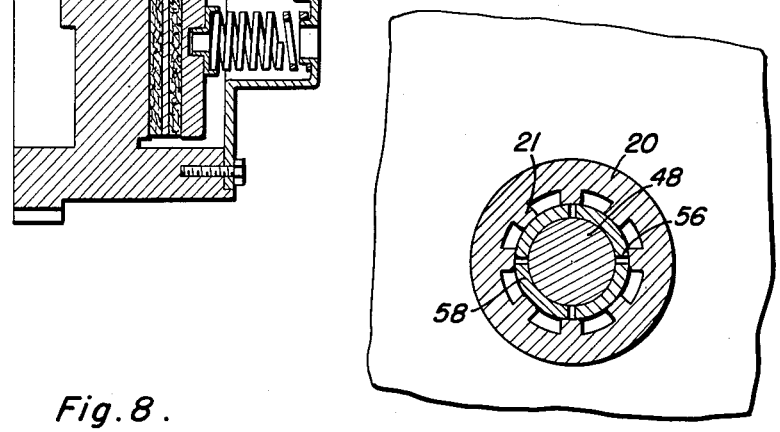
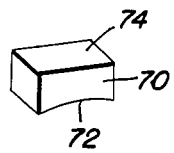
Inventor
Lester Lee Erwin
By *Clarence A. O'Brien and Harvey B. Jacobson*
Attorneys June 10, 1952
L. L. ERWIN
2,599,982
CLUTCH FINGER TOOL
Filed Oct. 27, 1949
2 SHEETS—SHEET 2
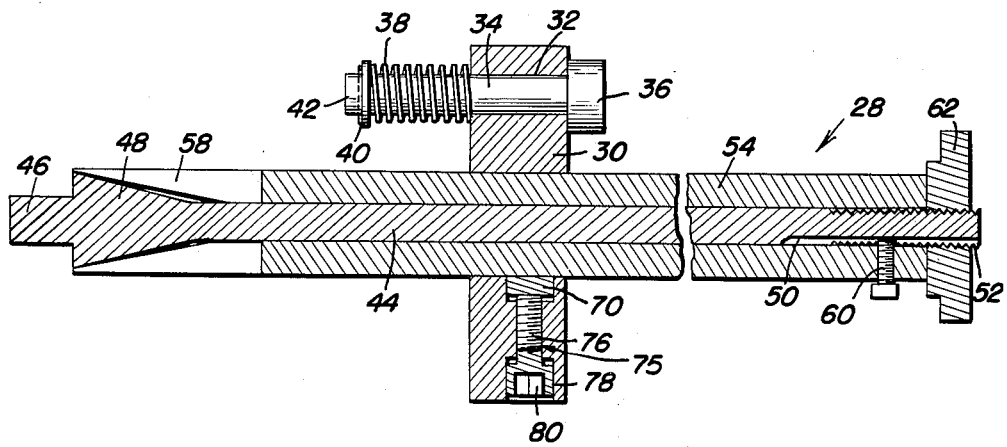
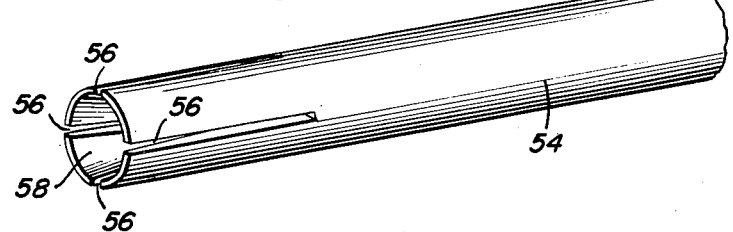
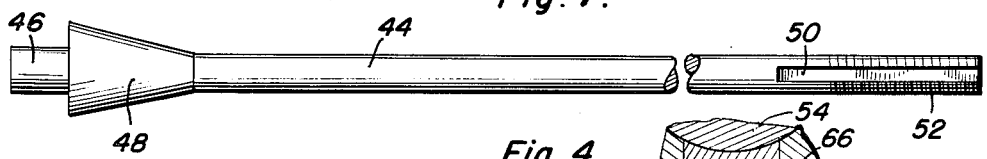
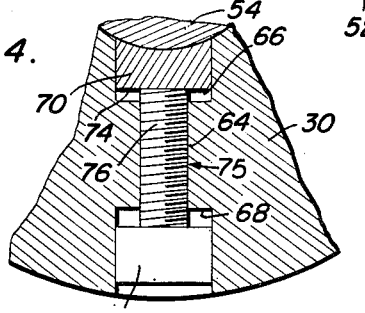
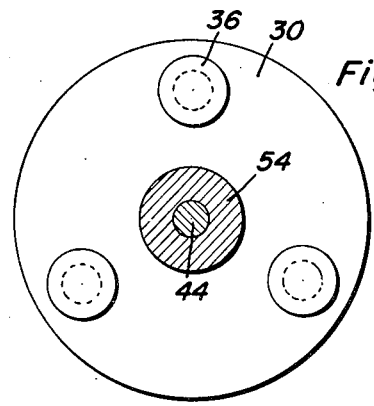
Inventor
Lester Lee Erwin
By Clarence A. O'Brien
and Harvey B. Jacobson
Attorneys Patented June 10, 1952

2,599,982

UNITED STATES PATENT OFFICE 2,599,982

CLUTCH FINGER TOOL

Lester Lee Erwin, San Diego, Calif.

Application October 27, 1949, Serial No. 123,824

4 Claims. (Cl. 33—181)

This invention comprises novel and useful improvements in a clutch finger tool and more specifically pertains to a clutch adjusting and gauge tool which is specifically adapted to assist in gauging and adjusting the clearances in the clutch finger mechanism of conventional form of clutches employed in automobile vehicles.

The primary object of this invention is to provide a clutch adjusting and gauge tool having an improved manner for applying the tool to a clutch assembly and having an improved gauging operation when so applied.

A further object of the invention is to provide a clutch adjusting and gauging tool in conformity with the foregoing object which shall be of simple and inexpensive construction, which is specifically adapted for operation upon automobile clutches and which has an improved and efficient gauging action and cooperation therewith.

These, together with various ancillary features and objects of the invention which will later become apparent as the following description proceeds, are attained by the present invention, a preferred embodiment of which is illustrated by way of example only in the accompanying drawings, wherein:

Figure 1 is a vertical longitudinal sectional view through a portion of a clutch assembly of a vehicle, illustrating the manner in which a preferred embodiment of the invention is applied thereto for effecting the clutch adjusting and gauging operation thereon;

Figure 2 is a vertical transverse sectional view taken substantially upon the plane of the section line 2—2 of Figure 1;

Figure 3 is a vertical central longitudinal sectional view through the tool forming the subject of this invention;

Figure 4 is a fragmentary vertical transverse sectional detail view taken substantially upon the plane of the section line 4—4 through the gauge body of the tool and showing the adjusting and fastening means for the same;

Figure 5 is a vertical transverse sectional view taken substantially upon the plane of the section line 5—5 of Figure 1;

Figure 6 is a perspective view of a sleeve forming a portion of the tool;

Figure 7 is a perspective view, parts being broken away, of a spindle forming part of the invention, and;

Figure 8 is a perspective view of a brake shoe forming an element of the tool.

Referring now more specifically to the accompanying drawings, wherein like numerals designate similar parts throughout the various views, attention is directed first to Figure 1 wherein it will be seen the numeral 10 indicates a portion of the crank shaft of an internal combustion engine or the like, having secured thereto in the conventional manner the fly wheel 12 upon which is mounted the conventional form of vehicle clutch indicated generally by the numeral 14, this clutch including a clutch collet bearing 16, a clutch plate 18 having a hub 20, a clutch pressure plate 22 together with a plurality of clutch pressure plate actuating fingers 24 which include clutch finger adjusting nuts 26, all of the construction so far described being of a well known and conventional form of automobile vehicle clutch.

The improved tool embodying the principle of this invention is indicated generally by the numeral 28, and in Figure 1 has been shown in applied and operative position with regard to the clutch mechanism for which it is designed, the details of this tool being indicated more specifically in Figure 3.

The tool 28 includes a gauge body 30 which may be of any desired character, but preferably consists of a substantially annular member as shown in Figures 1 and 5, which is centrally apertured for slidable engagement upon the stem portion of the tool. A plurality of bores 32 are formed through the gauge body 30, and slidably received in these bores are a plurality of gauging pins 34 having headed portions 36 adapted to abut one side of the gauge body 30, and provided with encircling compression springs 38 upon the other side of the gauge body, these springs being retained in compressed relation as by retaining pins 40 extending through diametrical bores in the pins 34, the latter extending beyond the springs and being provided with gauging surfaces indicated at 42.

It will now be seen that the compression springs 38 serve to retain the gauge pins with their heads 36 in abutment with the gauge body 30, and with their gauging surfaces or portions 42 resiliently urged away from the gauge block 30. As will be now understood, each of the gauge pins 34 is disposed for alignment and abutting engagement with the ends of the clutch fingers 24 as will be apparent from an inspection of Figure 1.

The stem construction of the gauge as revealed in Figures 3, 6 and 7, consists of a spindle or central rod 44 of any suitable construction, which is provided with an axial extension 46 at one end thereof for guiding reception in the collet bearing 16 as shown in Figure 1.

Adjacent this axial extension, the spindle is provided with a conical portion 48 constituting a cam member for a purpose which will be subsequently apparent. At its other end, the spindle 44 is provided with a longitudinally extending peripheral keyway or slot 50, while this end of the spindle is further provided with external screw threads 52. Slidably received upon the spindle 44, is a sleeve 54 which at one extremity is longitudinally slotted as at 56 to cause the formation of a radially yieldable zone upon the sleeve, this zone comprising a collet, consisting of resilient fingers 58 disposed between the slots 56.

The sleeve 54 carrying the collet portion, is slidable longitudinally of the spindle 44, and is retained against rotation thereon as by means of a set screw 60 which extends through one side of the spindle and has its end disposed in sliding engagement in the keyway or groove 50. A knurled, finger adjusting nut 62 is threaded upon the screw threaded extremity 52 of the spindle, and may be adjusted therealong to cause a longitudinal sliding movement of the sleeve 54 upon the spindle, to thereby force the collect portion of the sleeve upon the cam surface 48, and thereby radially expand the flexible fingers, so that the same may be squeezed to a tight frictional locking engagement with the interior of the hub 20, for thereby engaging radial splines 21, see Figure 2, disposed therein, so that by means of engagement of the axial extension 46 in the collet bearing 16, and the frictional locking engagement of the collet portion in the hub 20, the tool may be properly positioned in the clutch assembly and securely locked thereto.

Referring now more specifically to Figures 3, 4, and 8, it will be seen that there has been provided locking means whereby the gauge body 30 of the tool may be locked in selective longitudinally adjusted positions upon the stem of the tool. This locking means consists of a radially extending bore 64 extending from the periphery of the gauge body into the bore receiving the stem of the tool, this bore having its extremities diametrically enlarged as at 64 and 66, and being internally screw threaded at its mid portion. A friction brake shoe 70, is slidably received in this bore and is provided with a concave surface 72 constituting a frictional surface for engaging the exterior of the sleeve 54, and with a flat surface 74 adapted to be engaged by the end of the screw threaded shank 76 of an adjusting bolt 75, this shank being threaded through the internal threads of the bore 64, and having a headed portion 78 received in the enlarged portion 68, this headed portion in turn being provided with a recessed socket 80 by means of which the bolt may be adjusted.

The arrangement is such that when the bolt has been loosened, whereby the frictional engagement of the brake shoe 70 upon the sleeve 54 has been released, the gauge body 30 may be adjusted longitudinally of the stem portion of the tool, until as shown in Figure 1, the gauge surfaces 42 of the gauge pins 34 may be abutted against the clutch fingers 24. The fastening bolt 76 may then be tightened thereby pressing the friction brake shoe 70 into tight frictional locking engagement with the exterior surface of the sleeve 54, whereby the entire gauge body is locked against displacement upon the stem of the tool. When in this position, suitable adjustment may be made upon the adjusting nuts 26 of the clutch fingers, until the desired setting of the clutch fingers has been obtained. The present tool assists in attaining the proper adjustment since the distance from the end of the clutch fingers 24 engaged by the gauging pins 34, to an adjacent surface of the clutch plate 18 must be of a predetermined value in order that the clutch fingers and clutch operating mechanism may have the desired degree of adjustment desired. By means of the present tool, it is merely necessary to set the position of the gauge head 30 with respect to some fixed point of reference such as collet bearing 16, in order that the gauging surface 42 of the gauge pins 34 may be properly positioned to constitute a reference point by which the position of the clutch fingers may be adjusted.

From the foregoing, the construction and operation of the device together with its many advantages will be apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A clutch adjusting and gauge tool comprising a stem construction, means for supporting said stem construction in the collet bearing of a clutch assembly, means for adjustably and fixedly securing said stem construction to the hub of a clutch plate, said securing means threadedly engaging one end of said stem construction, a gauge body slidably mounted upon said stem construction, a plurality of adjusting pins slidably mounted on said body parallel to said stem construction and positioned each in alignment with a clutch adjusting finger when said tool is secured to a clutch assembly, said gauge body containing a lateral bore extending through said body to said stem construction, and means for securing said body upon said stem construction in adjusted position comprising a brake shoe slidable in said bore and frictionally engaging said stem construction, and an adjusting bolt screw threadedly engaged in said bore and engaging said shoe.

2. The combination of claim 1 wherein said bore has enlarged portions at its extremities, the intermediate portion of the bore being screw threaded, said shoe being slidably received in one enlarged portion, said bolt having a head received in the other enlarged portion.

3. The combination of claim 1 wherein said stem construction comprises a spindle, a sleeve slidable upon said spindle, means preventing rotation between said sleeve and spindle, and means for adjusting said sleeve longitudinally of said spindle.

4. The combination of claim 1 wherein said stem construction comprises a spindle, a sleeve slidable upon said spindle, means preventing rotation between said sleeve and spindle, means for adjusting said sleeve longitudinally of said spindle, said sleeve-adjusting means comprising a conical cam on said spindle, the end of said sleeve comprising a collet engageable with and expansible by said cam.

LESTER LEE ERWIN.

REFERENCES CITED

The following references are of record in the file of this patent:

UNITED STATES PATENTS

| Number | Name | Date |
| --- | --- | --- |
| 1,588,101 | Farnam | June 8, 1926 |
| 1,868,675 | Spase | July 26, 1932 |
| 1,935,678 | Valpey | Nov. 21, 1933 |
| 2,067,442 | Frisz | Jan. 12, 1937 |
| 2,178,293 | Wogeck | Oct. 31, 1939 |
| 2,487,504 | Yelkin | Nov. 8, 1949 |